(12) United States Patent
Hac

(10) Patent No.: US 6,892,123 B2
(45) Date of Patent: May 10, 2005

(54) UNIFIED CONTROL OF VEHICLE DYNAMICS USING FORCE AND MOMENT CONTROL

(75) Inventor: Aleksander B. Hac, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 80 days.

(21) Appl. No.: 10/331,526

(22) Filed: Dec. 30, 2002

(65) Prior Publication Data
US 2004/0128044 A1 Jul. 1, 2004

(51) Int. Cl.[7] .................. G06F 17/00; B60G 17/015
(52) U.S. Cl. ...................... 701/48; 701/72; 701/91; 280/5.518
(58) Field of Search ................ 701/37, 38, 41, 701/48, 72, 73, 78, 80, 82, 91, 83, 90; 180/408, 422; 280/5.504, 5.507, 5.518

(56) References Cited

U.S. PATENT DOCUMENTS

| | | | | |
|---|---|---|---|---|
| 4,761,022 A | * | 8/1988 | Ohashi et al. | 280/5.504 |
| 5,439,245 A | * | 8/1995 | Breitenbacher et al. | 280/5.518 |
| 5,500,798 A | * | 3/1996 | Inagaki | 701/37 |
| 5,510,986 A | * | 4/1996 | Williams | 701/38 |
| 5,931,887 A | | 8/1999 | Hac | 701/71 |
| 6,035,251 A | | 3/2000 | Hac et al. | 701/70 |
| 6,125,319 A | | 9/2000 | Hac et al. | 701/80 |
| 6,195,606 B1 | * | 2/2001 | Barta et al. | 701/70 |
| 6,453,226 B1 | | 9/2002 | Hac et al. | 701/48 |
| 6,546,324 B1 | | 4/2003 | Chen et al. | 701/48 |
| 6,549,842 B1 | | 4/2003 | Hac et al. | 701/80 |
| 6,564,129 B2 | | 5/2003 | Badenoch | 701/37 |

OTHER PUBLICATIONS

Masakl Yamamoto, "Active Control Strategy for Improved handling and Stability," SAE Technical Paper Series 911902, 1991, (month is not available).

* cited by examiner

Primary Examiner—Tan Q. Nguyen
(74) Attorney, Agent, or Firm—Michael D. Smith

(57) ABSTRACT

In an unified control of a plurality of active chassis systems a role of each chassis system in applying a corrective net force and a corrective moment to a vehicle is determined. In determining the roles, control influence coefficients and a control authority of each active chassis system is determined. An activation status of each active chassis system based on the control influence coefficients and the control authority is subsequently determined.

9 Claims, 8 Drawing Sheets

UNIFIED CONTROL OF VEHICLE DYNAMICS USING FORCE AND MOMENT CONTROL

BACKGROUND OF THE INVENTION

1. Field of the Invention

The present invention generally relates to control systems for automotive vehicles. The present invention specifically relates to a control of automotive vehicles equipped with two or more active chassis systems with each chassis system capable of influencing vehicle behavior in the yaw plane of the automotive vehicle. Examples of such active chassis systems include, but are not limited to, an active brake control system, an active front steer system, an active rear steer system, an active front and rear steer system, and an active roll bar or active suspension system.

2. Description of the Related Art

Traditionally, vehicle motion was controlled in the yaw plane by using brakes and throttle to control longitudinal motion and steering for directional control. Over the last 20 years many active chassis systems have been developed for allowing the driver to control vehicle in the normal range of operation and for correcting vehicle behavior when it deviates significantly from desired behavior. The need for intervention usually occurs when driver inputs (e.g., steering, brake or throttle) are excessive for given surface and speed conditions. These systems typically operate in a closed loop (feedback) fashion. That is, in determining a corrective input, these systems compare the desired response of vehicle determined from the driver inputs to the measured response of the vehicle or the individual wheels. The corrective input is applied to vehicle to force the actual vehicle response to conform to the desired response as closely as possible. Examples of active chassis systems currently in production or under development are (1) brake control including Anti-Lock Braking System (ABS), Traction Control System (TCS) and Vehicle Stability Enhancement (VSE) functions), (2) active rear steer, (3) active front steer, and (4) controllable suspension including active roll bars. More recently, vehicles being developed and produced are equipped with two or more active chassis systems. Each of them may be capable of fulfilling the control objectives required by feedback correction, at least to some extent.

As such, when and to what extent each system should be activated to achieve an accurate corrective input must be addressed. Appropriate addressing this issue is complicated, because each of the active chassis control systems are developed independently and different physical quantities are used as corrective control signals in each system. Furthermore, effectiveness of each chassis system depends on the operating point of vehicle and tires. There is therefore a need for unified control method for overcoming the aforementioned shortcomings described herein.

SUMMARY OF THE INVENTION

The present invention addresses the need of the prior art by providing a novel and unique unified control method and system for computing a control authority of each active chassis system in terms of forces and moments imparted on the vehicle (e.g., longitudinal and lateral forces and yaw moment) at each operating point of the vehicle. This information can be used to determine which system(s) should be activated and to what level in order to provide desired correction(s), as well as to decide how to partition the control actions among two or more subsystems.

One form of the present invention is a method of computing a control authority of each active chassis system in a vehicle. First, for an operating point of the vehicle, a determination of corrective net force inputs and a corrective moment input is performed. Second, a determination as to whether the vehicle is in a linear range of handling or a nonlinear range of handling is performed. Finally, when it is determined that the vehicle is in a nonlinear range of handling, a determination of a role for each chassis system in applying the corrective net force input and the correct moment input to the vehicle is performed.

The foregoing forms, and other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENTLY PREFERRED EMBODIMENTS

A vehicle in accordance with the present invention has two or more active chassis systems, such as, for example active brake control system, active front steer, active rear steer, and active roll bar. An active chassis system can provide control inputs to the vehicle (such as brake torque, front or rear steer angle or roll moments) independently of the driver; thus it is capable of introducing corrective actions using actuators. These actuators may be hydraulic, electric or of other type.

Figure 1:
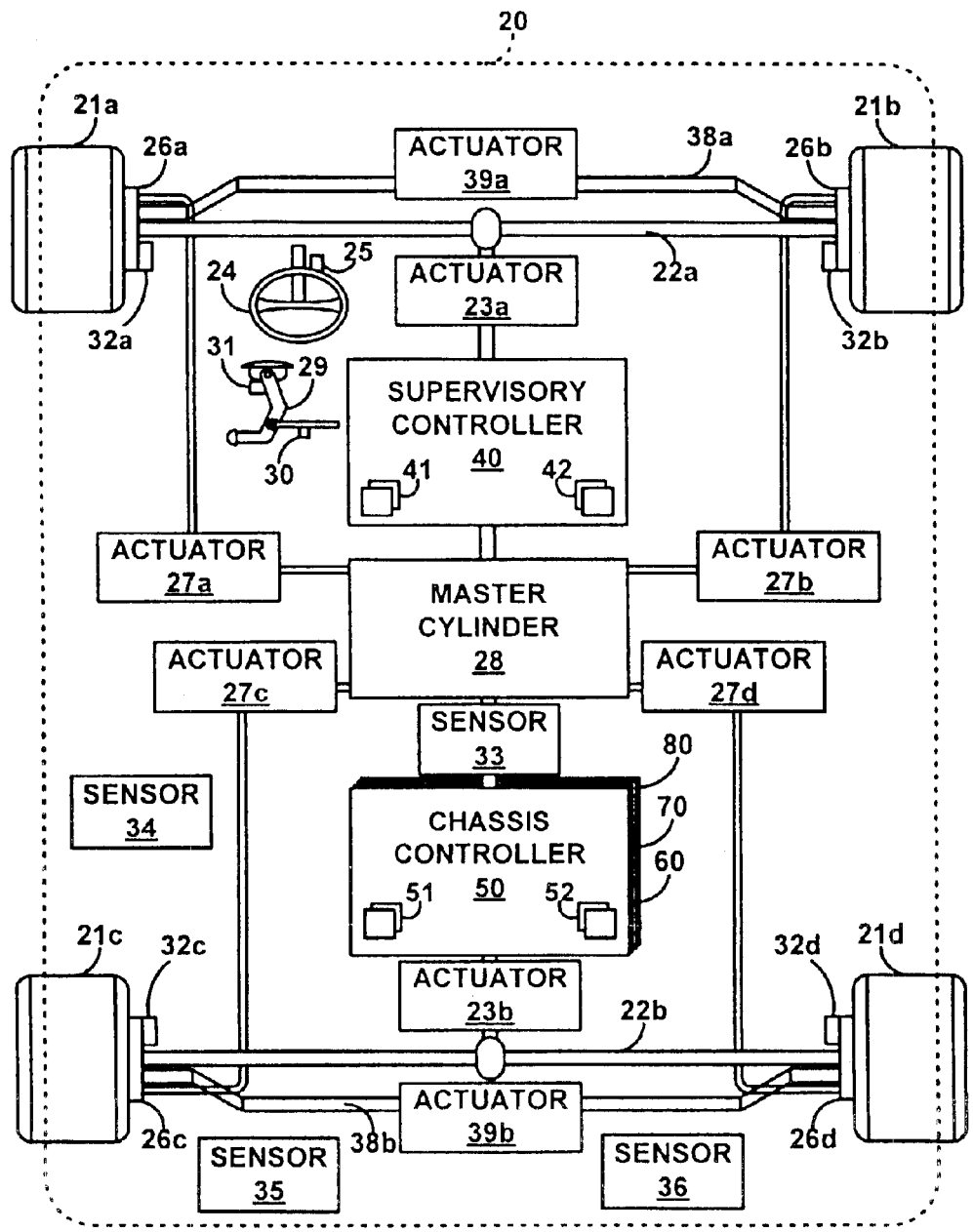
FIG. 1 illustrates a vehicle in accordance with one embodiment of the present invention.

FIG. 1 illustrates a vehicle 20 having a left front tire 21a, a right front tire 21b, a left rear tire 21c, and a right rear tire 21d. Left front tire 21a and right front tire 21b are coupled to a front axle 22a while left rear tire 21c and right rear tire 21d are coupled to a rear axle 22b.

A front steering actuator 23a applies a steering angle to left front tire 21a and right front tire 21b relative to front axle 22a. A rear steering actuator 23b applies a steering angle to left rear tire 21c and right rear tire 21d relative to rear axle 22b. A conventional steering wheel 24 is utilized to apply a desired steering angle to tires 21a–21d.

A brake 26a is coupled to left front tire 21a with a brake actuator 27a applying a brake force to left front tire 21a. A brake 26b is coupled to right front tire 21b with a brake actuator 27b applying a brake force to right front tire 21b. A brake 26c is coupled to left rear tire 21c with a brake actuator 27c applying a brake force to left rear tire 21c. A brake 26d is coupled right rear tire 21d with a conventional brake actuator 27d applying a brake force to right rear tire 21d. In a hydraulic brake system, the wheel brake actuators apply brake forces using pressurized fluid from master cylinder 28, as shown in FIG. 1, but in an electric brake system, brake actuators are powered by electric current from vehicle electrical system.

A front roll bar 38a is coupled to suspensions (not shown) of front tires 21a and 21b with a roll bar actuator 39a for controlling a rotation of front roll bar 38a. A rear roll bar 38b is coupled to suspensions (not shown) of rear tires 21c and 21d with a roll bar actuator 39b for controlling a rotation of rear roll bar 38b.

A supervisory controller 40 and a plurality of chassis controllers 50–80 are also illustrated in FIG. 1. Each chassis controller 50–80 controls a different active chassis system of vehicle 20. In one embodiment, chassis controller 50 controls an active brake control system, chassis controller 60 controls active front steer, chassis controller 70 controls active rear steer, and chassis controller 80 controls active roll bar.

Each active chassis system is capable of fulfilling any control objectives for vehicle 20, at least to some extent. For example, depending on the operating point of vehicle 20, a significant corrective yaw moment can be imparted on vehicle 20 by steering front wheels 21a and 21b, by steering rear wheels 21c and 21d, by braking of individual wheels (e.g. on one side of vehicle 20), or by changing the front to rear roll moment distribution via active roll bars 38a and 38b. An operational issue therefore arises which active chassis system(s) should be activated and to what extent to achieve the desired objective and how the control should be partitioned, if necessary, among the various active chassis systems.

Supervisory controller 40 addresses this operational issue by providing a coordinated control of all of the active chassis systems available on vehicle 20 via chassis controllers 50–80. The coordinated control is based on a force and moment approach to determine in real time the control authority of each active chassis system in terms of forces and moments exerted on vehicle 20. This information is subsequently used by supervisory controller 40 in deciding which active chassis systems should be activated and to what degree.

In order to make rational decisions in this regard, supervisory controller 40 implements a new and unique unified control method that is based on expressing the effects of various control actions on vehicle 20 in terms of the same physical quantity (e.g., a yaw moment imparted on vehicle 20). At present, each chassis control system uses a different physical quantity as corrective input. For example, the difference in circumferential speeds of left tires 21a and 21c, and right tires 21b and 21b in the case of a brake control system (VSE), a change in front wheel steering angle in the case of active front steer, a change in rear wheel steering angle in the case of active rear steer, or a change in the roll torque(s) (or pressure) in the case of active roll control system. The effects of each of these control actions must be expressed in terms of the same quantity and calculated at each operating point of vehicle 20, since their effects depend strongly on the operating point of vehicle 20.

Figure 2:
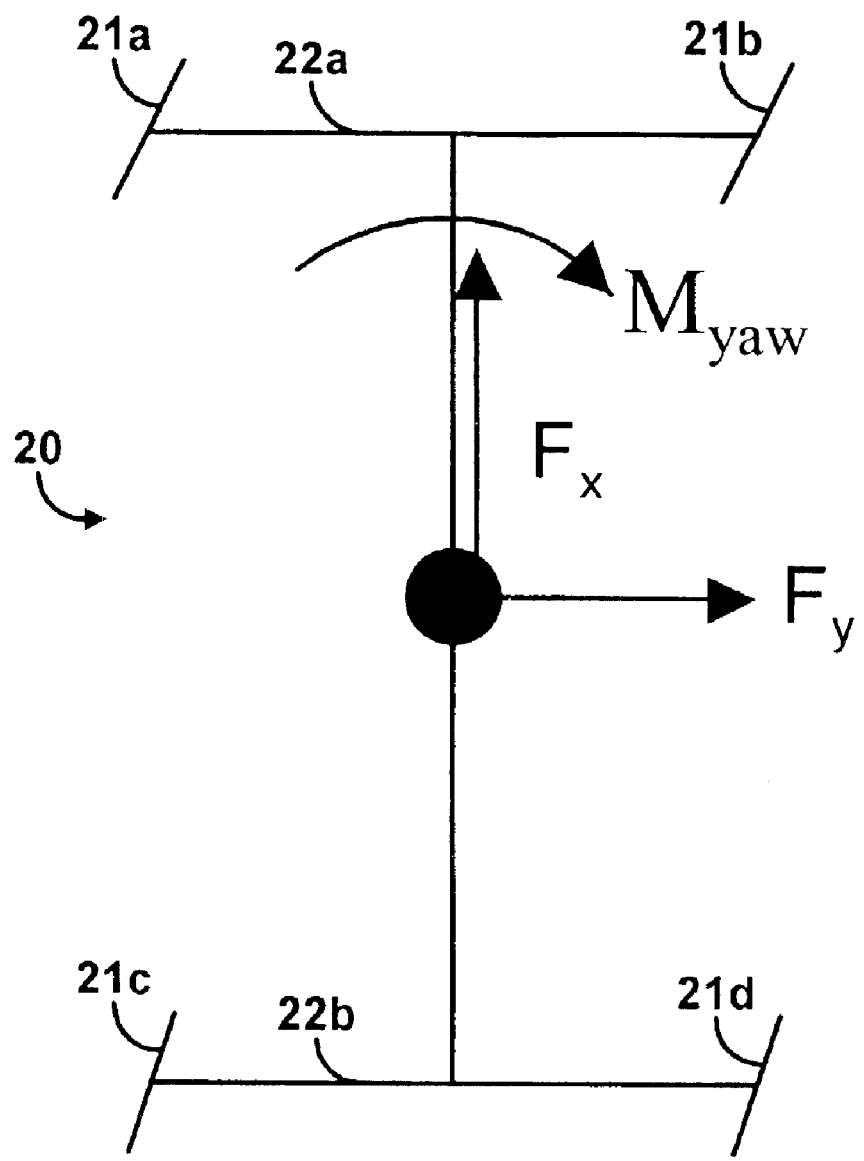
FIG. 2 illustrates resultant force and moment vectors as known in the art that are experienced by the vehicle of FIG. 1 during a right hand turning maneuver.

The forces and moments that uniquely determine motion of vehicle 20 in the yaw plane are longitudinal force $F_x$, lateral force $F_y$ and yaw moment $M_{yaw}$ as illustrated in FIG. 2. It is assumed here, that the vehicle desired response in terms of longitudinal acceleration, lateral acceleration, yaw rate and possibly lateral velocity will be determined from the reference model illustrated in FIG. 2 (a.k.a. driver command interpreter). These desired values are typically determined using driver steering, brake and throttle inputs and estimated vehicle speed based on simplified models of vehicle handling dynamics stored in on board microprocessor as known to those skilled in art. An example is U.S. Pat. No. 5,931,887, which is hereby incorporated by reference. During normal driving, this desired response would be achieved primarily through feed-forward control of powertrain, brake, steering and suspension systems. At the same time, the vehicle response (in terms of variables mentioned above) will be measured and compared with the desired response. If a sufficient discrepancy between the two is detected, the feedback part of the controller will command the desired changes in the longitudinal force, $\Delta F_x$, lateral force, $\Delta F_y$, and yaw moment, $\Delta M_{yaw}$, which should be imparted on vehicle to bring the desired response closer to the actual response. Determination of these desired changes in longitudinal force, lateral force, and yaw moment can be done using some forms of PID (proportional-integral-derivative) control operating on the differences between the desired and measured/estimated values of longitudinal acceleration, lateral acceleration, yaw rate and possibly lateral velocity (or slip angle). This again, is known to those skilled in art. Example determination of the desired change in the yaw moment for the brake control algorithm is in U.S. Pat. No. 6,035,251, which is hereby incorporated by reference.

The corrective net forces and moment, $\Delta F_x$, $\Delta F_y$, and $\Delta M_{yaw}$, cannot be applied directly to the vehicle 20. Rather they are achieved by indirectly influencing the tire forces using steering, braking and suspension actuators illustrated in FIG. 1. It is primarily the determination of the effects of actuators on the forces and moments acting on vehicle 20 that this invention is concerned with. More specifically, the proposed algorithm provides a method for the supervisory controller 40 to make rational decisions regarding the determination of control actions of actuators that would result in achieving the desired corrections in the longitudinal and lateral forces and the yaw moment. In practice, there will be situations when only approaching the desired motion as closely as possible is a satisfactory outcome, because of limitations of control authority resulting from surface friction.

Figure 3:
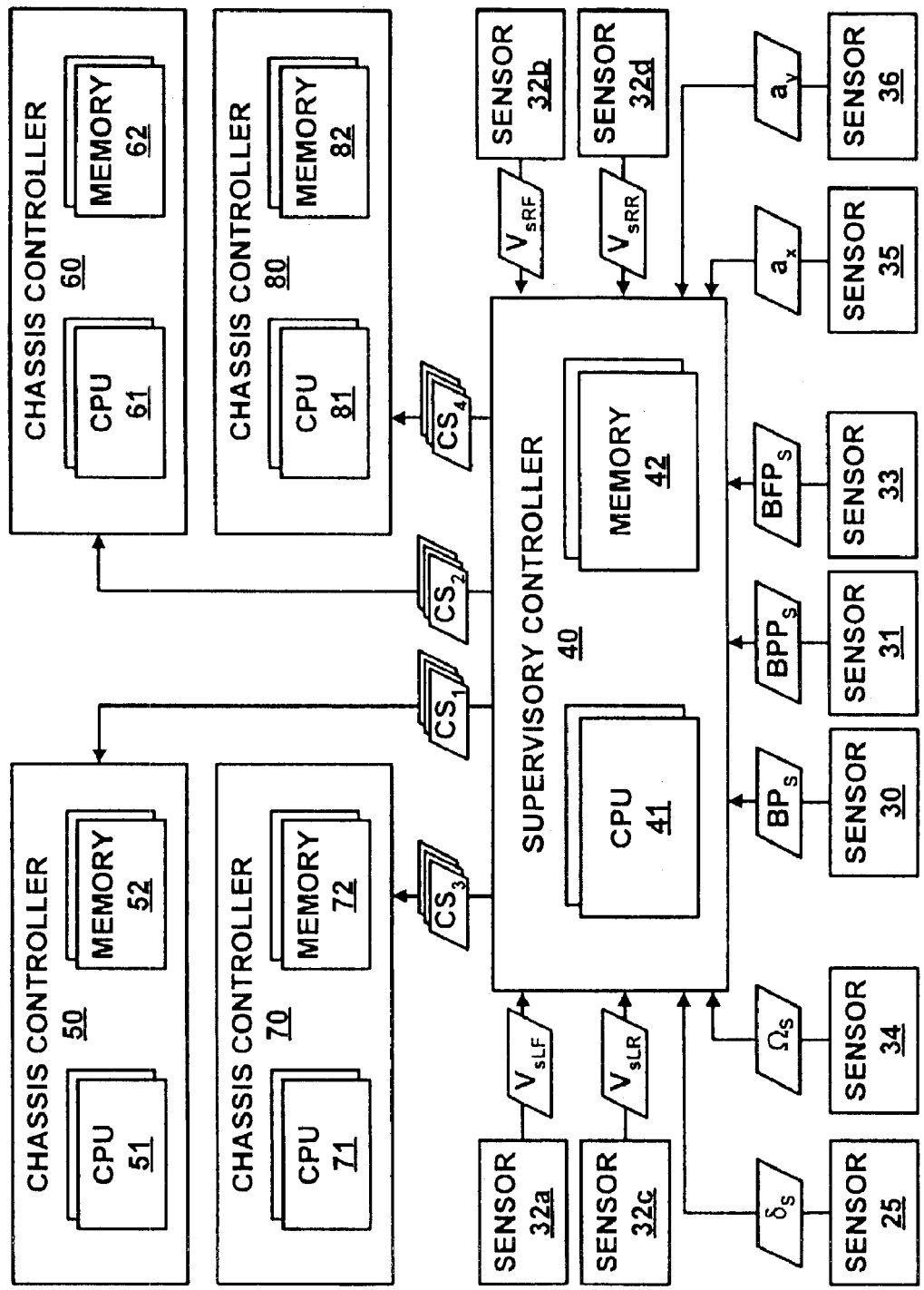
FIG. 3 illustrates an operational relationship of a supervisory controller and a plurality of chassis controllers in accordance with one embodiment of the present invention.

FIG. 3 illustrates supervisory controller 40 and chassis controllers 50–80. Supervisory controller 40 is an electronic circuit comprised of one or more components that are assembled as a common unit. Alternatively, for the multiple component embodiments, one or more of these components may be distributed throughout vehicle 20. Supervisory controller 40 may be comprised of digital circuitry, analog circuitry, or both (e.g. an application specific integrated circuit). Also, supervisory controller 40 may be programmable, a dedicated state machine, or a hybrid combination of programmable and dedicated hardware. All signals described herein can be either in analog form or digital form. Thus, to implement the principals of the present invention, supervisory controller 40 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, supervisory controller 40 includes one or more central processing units 41 operatively coupled to one or more solid-state memory devices 42. Memory device(s) 42 contain programming corresponding to a flowchart 90 (FIG. 4) for implementing the unified control method of the present invention and is arranged for reading and writing of data in accordance with the principals of the present invention.

To this end, supervisory controller 40 receives various signals from various sensors of vehicle 20. One signal is steering angle signal $\delta_S$ from a conventional steering wheel sensor 25 coupled to a steering wheel 24. A second signal is a yaw rate signal $U_S$ from a conventional yaw rate sensor 34. An optional third signal is a brake pedal switch signal $BP_S$ from a conventional brake pedal switch 30 coupled to brake pedal 29. A fourth signal is a reception of a brake pedal position or brake pedal force signal $BPP_S$ from a conventional brake pedal position or force sensor 31 coupled to brake pedal 29. A fifth signal is a brake fluid pressure signal $BFP_S$ from a conventional brake fluid pressure sensor 33 coupled to master cylinder 28. From this signal wheel brake torques can be estimated using a model of hydraulic system. Alternatively, pressure sensors may be available at each caliper. In the case of an electric brake system, actuating force or motor shaft position are measured and can be used to estimate brake torques at each wheel.

A sixth signal is a longitudinal acceleration signal $a_x$ from sensor 35. A seventh signal is lateral acceleration signal $a_y$ from sensor 36. An eighth signal is a left front tire speed signal $V_{sLF}$ from a conventional speed sensor 32a coupled to left front tire 21a. A ninth signal is a right front tire speed signal $V_{sRF}$ from a conventional speed sensor 32b coupled to right front tire 21b. A tenth signal is a left rear tire speed signal $V_{sLR}$ from a conventional speed sensor 32c coupled to left rear tire 21c. An eleventh signal is a right rear tire speed signal $V_{sRR}$ from a conventional speed sensor 32d coupled to right rear tire 21d. A twelfth signal is a rear wheel steering angle $\delta_R$ (not shown) if the active rear steer system is available.

In addition to the above measured signals, the estimates of driving torque (at the driven wheels) and the surface coefficient of adhesion are assumed to be available. The estimate of driving torque can be obtained from powertrain controller using the powertrain model. The estimate of surface coefficient can be obtained primarily from lateral and longitudinal accelerations and other signals available here, as described for example in U.S. Pat. Nos. 6,125,319 and 6,453,226, and U.S. patent application Ser. No. 10/003,713, all of which are hereby incorporated by reference.

An implementation of the unified control method (FIG. 4) by supervisory controller 40 results in a generation of control signals $CS_1$–$CS_3$ to chassis controllers 50–80 whereby each chassis controller 50–80 conventionally provides the appropriate signals to a corresponding actuator or actuators in achieving the unified control directed by supervisory controller 40.

Each chassis controller 50–80 is an electronic circuit comprised of one or more components that are assembled as a common unit. Alternatively, for the multiple component embodiments, one or more of these components may be distributed throughout vehicle 20. Each chassis controller 50–80 may be comprised of digital circuitry, analog circuitry, or both (e.g. an application specific integrated circuit). Also, each chassis controller 50–80 may be programmable, a dedicated state machine, or a hybrid combination of programmable and dedicated hardware. All signals described herein can be in analog form or in digital form. Thus, to implement the principals of the present invention, each chassis controller 50–80 can further include any control clocks, interfaces, signal conditioners, filters, Analog-to-Digital (A/D) converters, Digital-to-Analog (D/A) converters, communication ports, or other types of operators as would occur to those having ordinary skill in the art.

In one embodiment, each chassis controller 50–80 includes one or more central processing units 51–81, respectively operatively coupled to one or more solid-state memory devices 52–82, respectively. Memory device(s) 52–82 contain conventional programming for controlling corresponding actuators in accordance with control signals $CS_1$–$CS_4$, respectively.

Figure 4:
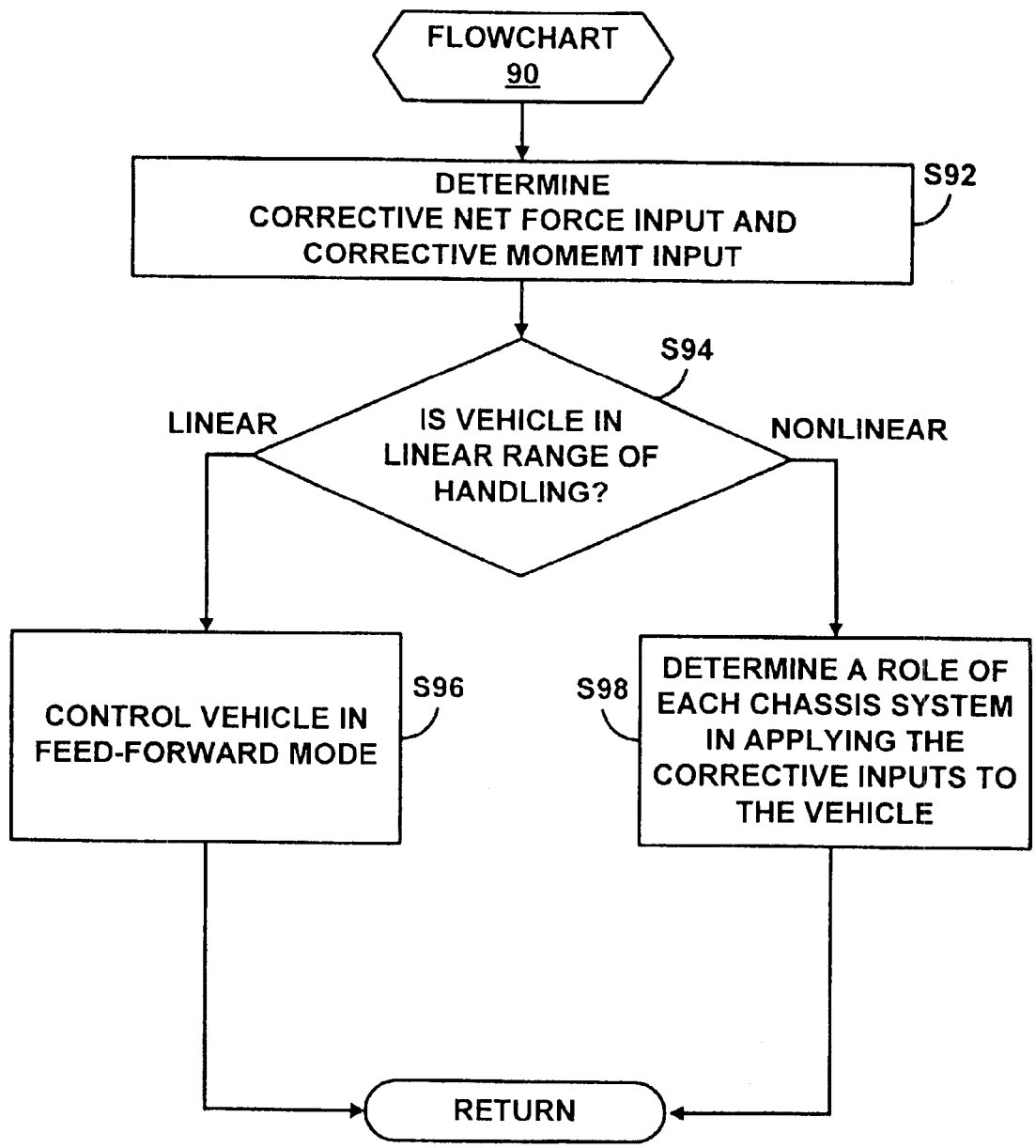
FIG. 4 illustrates a flow chart representative of a unified control method in accordance with one embodiment of the present invention.

FIG. 4 illustrates a flowchart 90 representative of the unified control method of the present invention. During a stage S92 of flowchart 90, a corrective net force input and a corrective moment input are determined. In one embodiment, supervisory controller 40 implements a corrective input method of the present invention as represented by a flowchart 100 illustrated in FIG. 5.

During a stage S102 of flowchart 100, the front/rear roll moment distribution factors at the present operating point of vehicle is determined. For a vehicle with a passive suspension, the front/rear roll moment distribution factors are computed in accordance with the following equations [1] and [2]:

$$\kappa_f = k_{rollf}/(k_{rollf} + k_{rollr}) \quad [1]$$

$$\kappa_r = 1 - \kappa f \quad [2]$$

The factor κf represents the fraction of the total roll moment developed by front suspension and κr by the rear suspension. The symbols $k_{rollf}$ and $k_{rollr}$ are the roll stiffness values of front and rear suspensions, including the effects of springs and roll bars. For a vehicle with passive suspension these factors are fixed (constant) and do not need to be computed at each iteration.

For a vehicle with active roll control, the front/rear roll moment distribution factors are computed in accordance with the following equations [3] and [4]:

$$\kappa f = M_{rollf}/(M_{rollf} + M_{rollr}) \quad [3]$$

$$\kappa r = 1 - \kappa f \quad [4]$$

Here $M_{rollf}$ and $M_{rollr}$ represent the roll moments of front and rear suspensions, respectively. Each of them comprises the effects of passive springs and the actively generated roll moments and they are computed in accordance with the following equations [5] and [6]:

$$M_{rollf} = k_{rollf} * \phi + T_f \quad [5]$$

$$M_{rollr} = k_{rollr} * \phi + T_r \quad [6]$$

where $k_{rollf}$ and $k_{rollr}$ are the roll stiffness coefficients contributed by front and rear suspension (passive) springs and $T_f$ and $T_r$ are the roll moments contributed by front and rear active roll bars. The variable φ is an estimated roll angle of vehicle body, which can be calculated in accordance with the following equation [7]:

$$\phi = (-m_s * a_y * h_{rollf} + T_f + T_r)/(k_{rollf} + k_{rollr}) \quad [7]$$

where $m_s$ is the sprung mass of vehicle, $a_y$ is the measured lateral acceleration, and $h_{roll}$ is the height of vehicle center of gravity above the roll axis. In the above equation SAE sign convention is used. That is, in a right turn lateral acceleration is positive, roll angle is negative and moments $T_f$ and $T_r$ resisting body roll are positive. The moments $T_f$ and $T_r$ developed by the active roll bars can be determined from measured hydraulic pressures and other system parameters in a manner known to those skilled in art.

It should be noted that there exists other methods of estimating the vehicle body roll angle, $\phi$, especially when suspension deflection sensors are available.

During a stage S104 of flowchart 100, the normal load of each tire is determined. In one embodiment, measured lateral and longitudinal accelerations, the roll moment distribution factors, and known vehicle parameters are utilized in determining the normal load of individual tires in accordance with the following equations [8]–[11]:

$$N_{LF}=m^*b^*g/(2^*L)-m^*a_x^*h_{cg}/(2^*L)-\kappa f^*m^*a_y^*h_{cg}/t_w=N_{Fs}-\Delta N_x-\Delta N_{Fy} \quad [8]$$

$$N_{RF}=m^*b^*g/(2^*L)-m^*a_x^*h_{cg}/(2^*L)+\kappa f^*m^*a_y^*h_{cg}/t_w=N_{Fs}-\Delta N_x+\Delta N_{Fy} \quad [9]$$

$$N_{LR}=m^*a^*g/(2^*L)+m^*a_x^*h_{cg}/(2^*L)-\kappa r^*m^*a_y^*h_{cg}/t_w=N_{Rs}+\Delta N_x-\Delta N_{Ry} \quad [10]$$

$$N_{RR}=m^*a^*g/(2^*L)+m^*a_x^*h_{cg}/(2^*L)-\kappa r^*m^*a_y^*h_{cg}/t_w=N_{Rs}+\Delta N_x+\Delta N_{Ry} \quad [11]$$

Here m is the total mass of vehicle, a and b are distances of the vehicle center of gravity to front and rear axles, respectively, L=a+b is the vehicle wheel-base, g is gravity acceleration, $h_{cg}$ is height of vehicle center of gravity above ground and $t_w$ is the track width (assumed the same front and rear), $a_x$ and $a_y$ are measured longitudinal and lateral accelerations of vehicle. $N_{Fs}$ and $N_{Rs}$ are the static loads (per tire) front and rear, $\Delta N_x$ is the normal load transfer due to longitudinal acceleration, $\Delta N_{Fy}$ and $\Delta N_{Ry}$ are the normal load transfers for the front and rear tires due to lateral acceleration. In the above expressions longitudinal acceleration $a_x$ is positive during accelerating (and negative during braking), while lateral acceleration $a_y$ is positive in a right turn.

Figure 6:
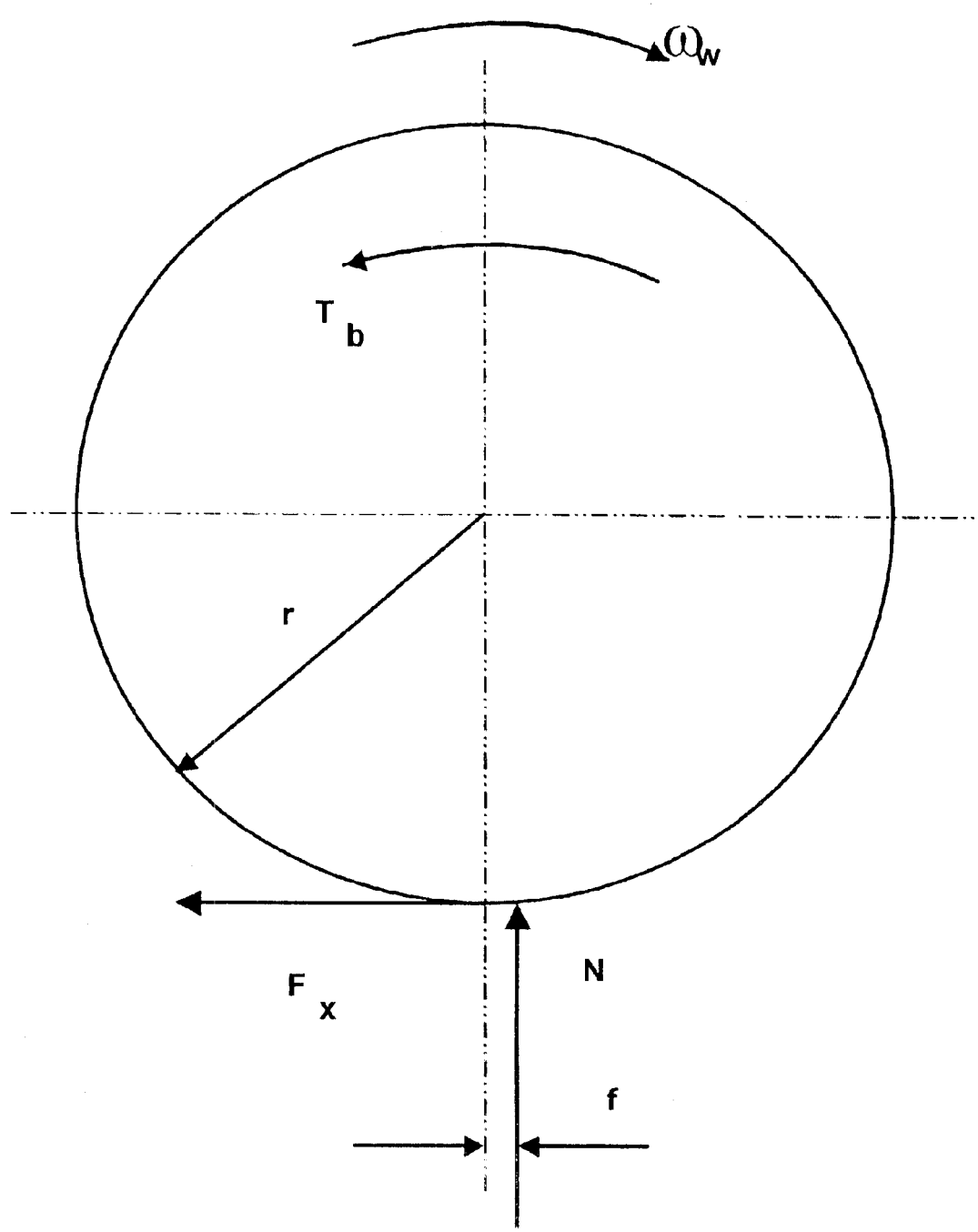
FIG. 6 illustrates various force and moment vectors as known in the art that are experienced by a wheel of the vehicle of FIG. 1 during a right hand turning maneuver.

During a stage S106 of flowchart 100, tire longitudinal forces and lateral forces per axle and per each tire are determined. The longitudinal tire forces can be calculated from equations of wheel rotary dynamics using estimated (or measured) brake and/or powertrain torques. Referring to FIG. 6, which illustrates a wheel under braking moment, $T_b$, the tire force, $F_x$, can be computed from the balance of moments acting on the wheel in accordance with the following equation [12]:

$$F_x=(T_b+f^*N+I_w^*d_{\omega w}/dt)/r \quad [12]$$

where f is the rolling resistance coefficient, N is the normal load (determined in stage S104, although a static value can be used due to small value of the term f*N), $I_w$ is the wheel moment of inertia about the axis of rotation, r is tire radius, and $\omega_w$ is the wheel rotational speed, measured by wheel speed sensor. The term $d_{\omega w}/dt$, which is a time derivative of wheel rotational velocity (e.g. wheel angular acceleration), is in practice determined by passing the measured wheel velocity, $\omega w$, through a high-pass filter.

The lateral forces per axle are obtained from the simplified equations of vehicle dynamics in the yaw plane, expressing the lateral motion and rotary (yaw) motion. This yields the following system of equations [13] and [14]:

$$m^*a_y=F_{yf}+F_{yr} \quad [13]$$

$$I_{zz}^*d\Omega/dt=F_{yf}^*a-F_{yr}^*b+\Delta F_{xLR}^*t_w/2 \quad [14]$$

Here $F_{yf}$ and $F_{yr}$ are the lateral forces per axle, $I_{zz}$ is the vehicle moment of inertia about the yaw axis, $\Omega$ is vehicle yaw rate, and $\Delta F_{xLR}$ is the difference in the longitudinal forces between the left and right tires. Solving for the axle lateral forces yields the following equations [15] and [16]:

$$F_{yf}=(I_{zz}^*d\Omega/dt+m^*a_y^*b-\Delta F_{xLR}^*t_w/2)/L \quad [15]$$

$$F_{yr}=(-I_{zz}^*d\Omega/dt+m^*a_y^*a+\Delta F_{xLR}^*t_w/2)/L \quad [16]$$

In the above equations the yaw rate, $\Omega$, and lateral acceleration, $a_y$, are directly measured, the difference in longitudinal forces, $\Delta F_{xLR}$, is computed from previously determined estimates of longitudinal forces ($\Delta F_{xLR}=F_{xLF}+F_{xLR}-\Delta F_{xRF}-F_{xRR}$). The remaining symbols denote known vehicle parameters.

Assuming that the distribution of lateral forces between the left and right tires of a given axle is proportional to the normal forces, one obtains the following equations [17]–[20] for the tire lateral forces:

$$F_{yLF}=F_{yf}^*N_{LF}/(N_{LF}+N_{RF}) \quad [17]$$

$$F_{yRF}=F_{yf}^*N_{RF}/(N_{LF}+N_{RF}) \quad [18]$$

$$F_{yLR}=F_{yr}^*N_{LR}/(N_{LR}+N_{RR}) \quad [19]$$

$$F_{yRR}=F_{yr}^*N_{RR}/(N_{LR}+N_{RR}) \quad [20]$$

During a stage S108, an efficiency of each tire and the force available for control at each tire are determined. The efficiency of each tire is determined as the ratio of the resultant tire force in the yaw plane to the total available force. This ratio is given by the following equation [21]:

$$e=(F_x^2+F_y^2)^{1/2}/(\mu^*N) \quad [21]$$

It is calculated for each of four tires. The symbol $\mu$ denotes the estimated surface coefficient of adhesion. The remaining force available for control for each tire is a difference between the total force available in the yaw plane and the resultant force developed at the tire/road contact patch in accordance with the following equation [22]:

$$F_{rem}=\mu^*N-(F_x^2+F_y^2)^{1/2}=(1-e)^*(\mu^*N) \quad [22]$$

The remaining control authority (available force) for each tire is simply the increment in tire horizontal force that would result in saturation of the tire. This value may depend on the direction of change, which is required by the control law. Stage S108 is optional and the information obtained here may be used in the control allocation portion of the algorithm. Generally, it is desirable to maintain tire efficiencies on similar levels on all four tires, rather than saturating one or two of them and under-utilizing the others. In this manner the friction potential of all tires is utilized to roughly the same degree.

Referring to FIG. 4, during a stage S94 of flowchart 90, a determination as to whether the vehicle is in the linear range of handling or a nonlinear range of operation is performed. In one embodiment, the vehicle is considered to be in the linear range of operation if the magnitude of resultant acceleration is below threshold value in accordance with the following equation [23]:

$$(a_x^2+a_y^2)<a_{thre}^*\mu^*g \quad [23]$$

where $a_{thre}$ is a predetermined constant (e.g. 0.5) and the entry conditions for vehicle VSE (Vehicle Stability Enhancement) system, ABS (Anti-Lock Brake System) or TCS (Traction Control System) are not satisfied. (The entry conditions for VSE typically require the measured yaw rate to deviate from the desired yaw rate by an amount exceeding a threshold and/or other conditions. The entry conditions for ABS or TRC are typically met when the estimated slips or angular decelerations/accelerations of braked/driven wheels exceed thresholds).

If the range of handling is linear, then the flowchart 90 proceeds to a stage S96 where the vehicle longitudinal motion is primarily controlled by brakes (and powertrain), the lateral motion by steering, and the vertical motion by suspension. In this range of operation vehicle motion is primarily controlled in feed-forward mode (on the vehicle level), since very small error in vehicle motion is expected.

If the range of handling is nonlinear, then the flowchart 90 proceeds to a stage S98 wherein a role of each active chassis system in applying the corrective inputs to the vehicle is determined. In one embodiment, an authority control method of the present invention as represented by a flowchart 110 illustrated in FIG. 7 is implemented by supervisory controller 40 during stage S98.

Figure 7:
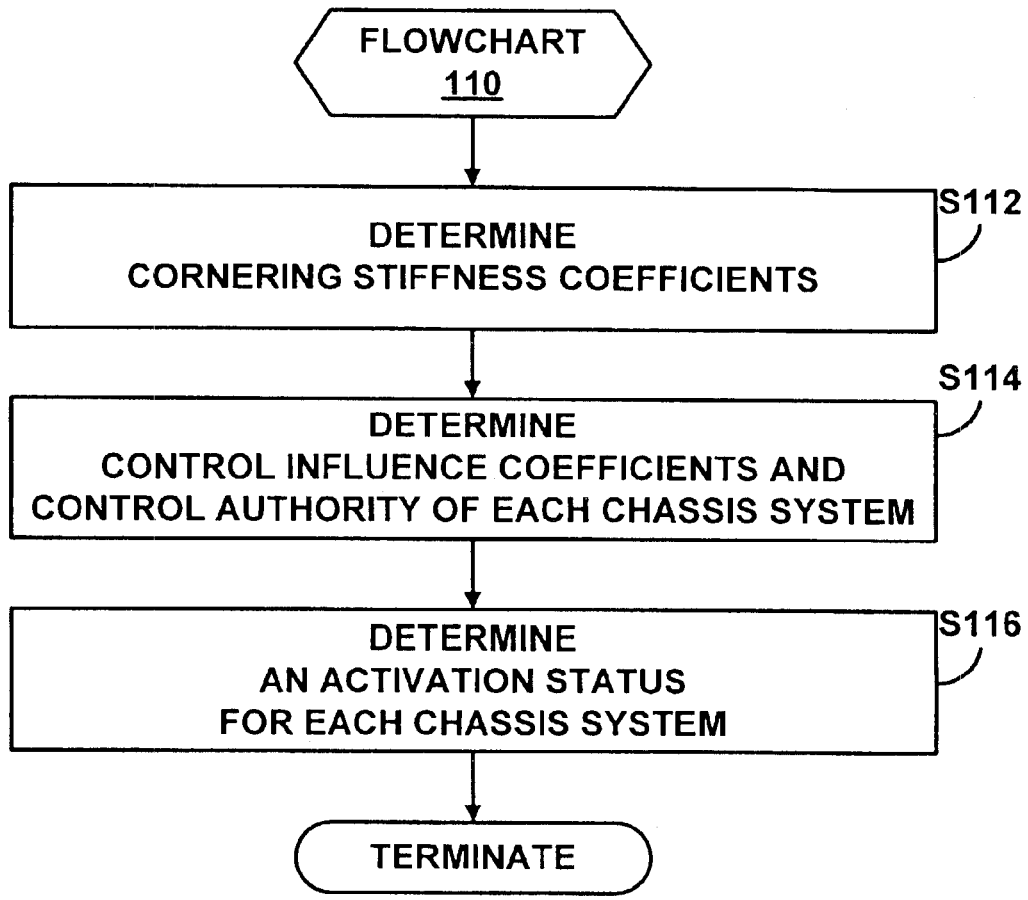
FIG. 7 illustrates a flow chart representative of an authority control method in accordance with one embodiment of the present invention.

Referring to FIG. 7, during a stage S112 of flowchart 110, cornering stiffness coefficients for each tire at the current operating point are determined. Cornering stiffness coefficient of individual tire is defined as a slope of a curve relating lateral tire force, $F_y$, to the tire side-slip angle, $\alpha$. Mathematically, it is a partial derivative of lateral force with respect to tire slip angle: $\partial F_y / \partial \alpha$. It depends on the operating point of tire, primarily on the tire slip angle (which is related to lateral force), tire longitudinal slip (related to longitudinal force), and tire normal force. It is large and almost constant in the linear range of tire operation, but drops to zero at the limit of adhesion (when the tire lateral force saturates and cannot be increased by increasing the side-slip angle).

The cornering stiffness coefficient for the left front tire is calculated in accordance with the following equation [24]:

$$C_{yLF} = C_{y0} * (N_{LF}/N_0) * [1 - k*(N_{LF} - N_0)/N_0] * [1 - (F_{xLF}^2 + F_{yLF}^2)/(\mu * N_{LF})^2] \quad [24]$$

Here $C_{y0}$ is the cornering stiffness at the nominal normal load, $N_0$, and k is the cornering stiffness sensitivity coefficient, with a typical value of 0.5. Analogous equations apply to the remaining wheels. Cornering stiffness coefficient describes the sensitivity of tire force to changes in the tire slip angle at the tire operating point, thus it is very useful in determining control influence coefficients. This is especially true for steering inputs, which affect tire slip angles directly.

During a stage S114 of flowchart 100, the control influence coefficients and the available control authority in terms of longitudinal force, lateral force and yaw moment that is available for each of the control systems is determined. Stage S114 is computationally intensive and is described below. The control influence coefficients indicate the effects of incremental (small) changes in control inputs on vehicle level forces/moments, while the control authority indicates how much these forces/moments can be changed if the entire actuator range is used.

Figure 8:
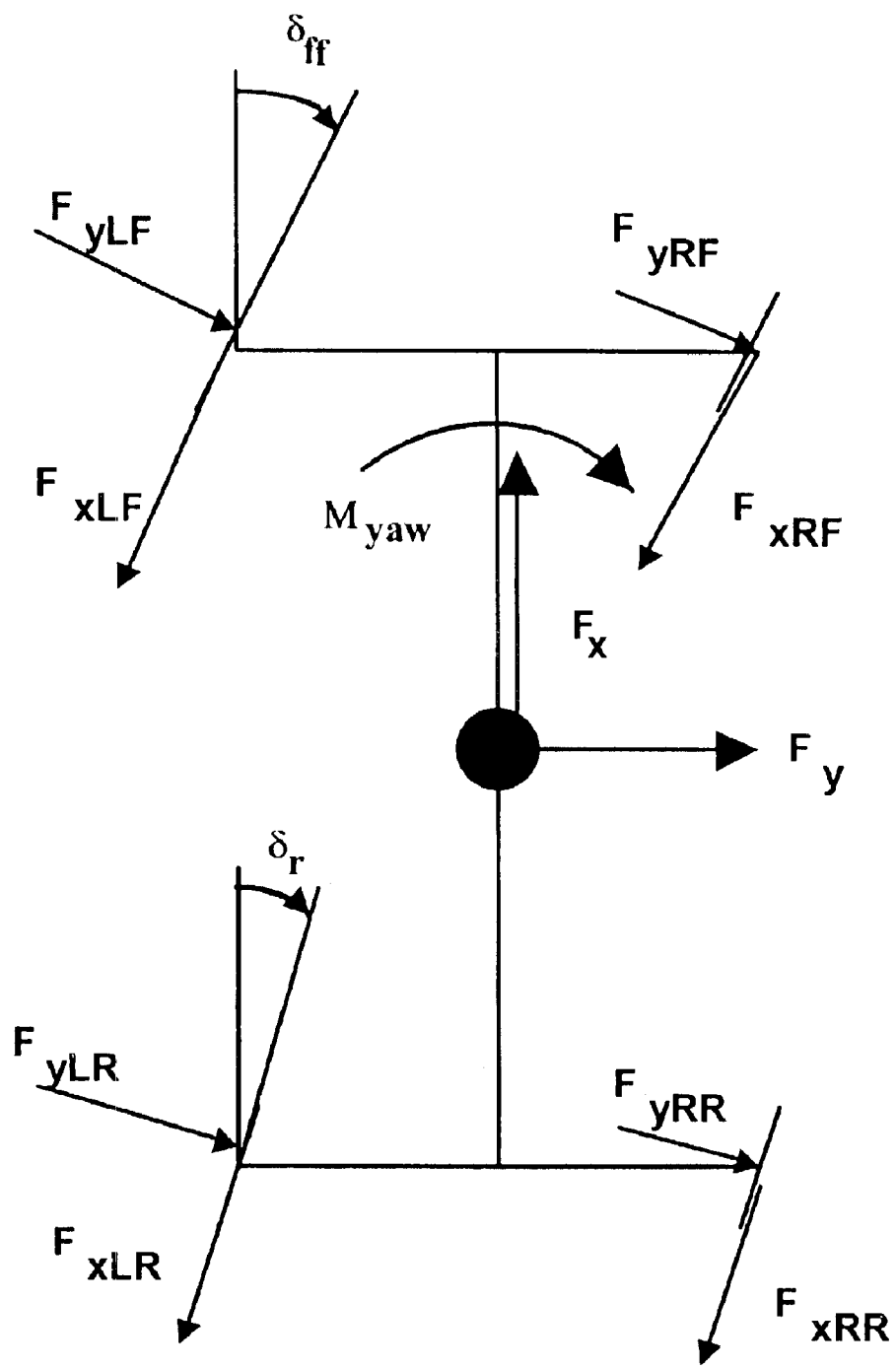
FIG. 8 illustrates various force and moment vectors as known in the art that are experienced by the vehicle of FIG. 1 during a right hand turning maneuver.

The following is an example of calculating the control sensitivity coefficients and the maximum control authority in terms of lateral force, longitudinal force and yaw moment correction. It is assumed that the vehicle is turning right and a counterclockwise yaw moment is required (oversteer correction). The forces acting on vehicle are illustrated in FIG. 8. It is assumed in the following equations that the steer angle(s), $\delta_f$ and $\delta_r$, are small, that is sin $\delta_{f/r} \approx \delta_{f/r}$ and cos $\delta_{f/r} \approx 0$.

1. Steering Front Wheels

Since the change of the steering angle by a small increment $\Delta\delta_f$ results in a change of front slip angle by the same amount, the control sensitivity coefficients for the lateral force, longitudinal force and yaw moment with respect to the change in steering angle in accordance with the following equations [25]–[27]:

$$\partial F_y / \partial \delta_f = C_{yLF} + C_{yRF} \quad [25]$$

$$\partial F_x / \partial \delta_f = (C_{yLF} + C_{yRF}) * \delta_f \quad [26]$$

$$\partial M_{yaw} / \partial \delta_f = (C_{yLF} + C_{yRF}) * a \quad [25]$$

where $C_{yLF}$ and $C_{yRF}$ are the cornering stiffness coefficients of front tires at the present operating point determined in stage S112. The sensitivity coefficients for lateral force and yaw moment are large in the linear range of handling and approach zero when tires are saturated. It is also seen that the influence of steering on longitudinal force is small at small steering angles.

The maximum control authority in terms of lateral force and yaw moment correction depends on the direction of desired correction. Depending on this direction, it can be achieved by either increasing the steering angle in the direction of present steering angle to a point corresponding to the saturation of tire lateral force, or by counter-steering to the point of reaching maximum tire force in the opposite direction. For the longitudinal force, the maximum braking force is achieved by steering to the limit and the maximum forward force by bringing the steer angle to zero in accordance with the following equations [28]–[30]:

$$\Delta F_{ymax} = (+/- F_{yLFmax} +/- F_{yRFmax} - F_{yLF} - F_{yRF}) \quad [28]$$

$$\Delta F_{xmax} = -(F_{yLFmax} + F_{yRFmax}) * \delta_{max}/0 - (F_{yLF} + F_{yRF}) * \delta \quad [29]$$

$$\Delta M_{yawmax} = (+/- F_{yLFmax} +/- F_{yRFmax} - F_{yLF} - F_{yRF}) * a \quad [30]$$

Figure 5:
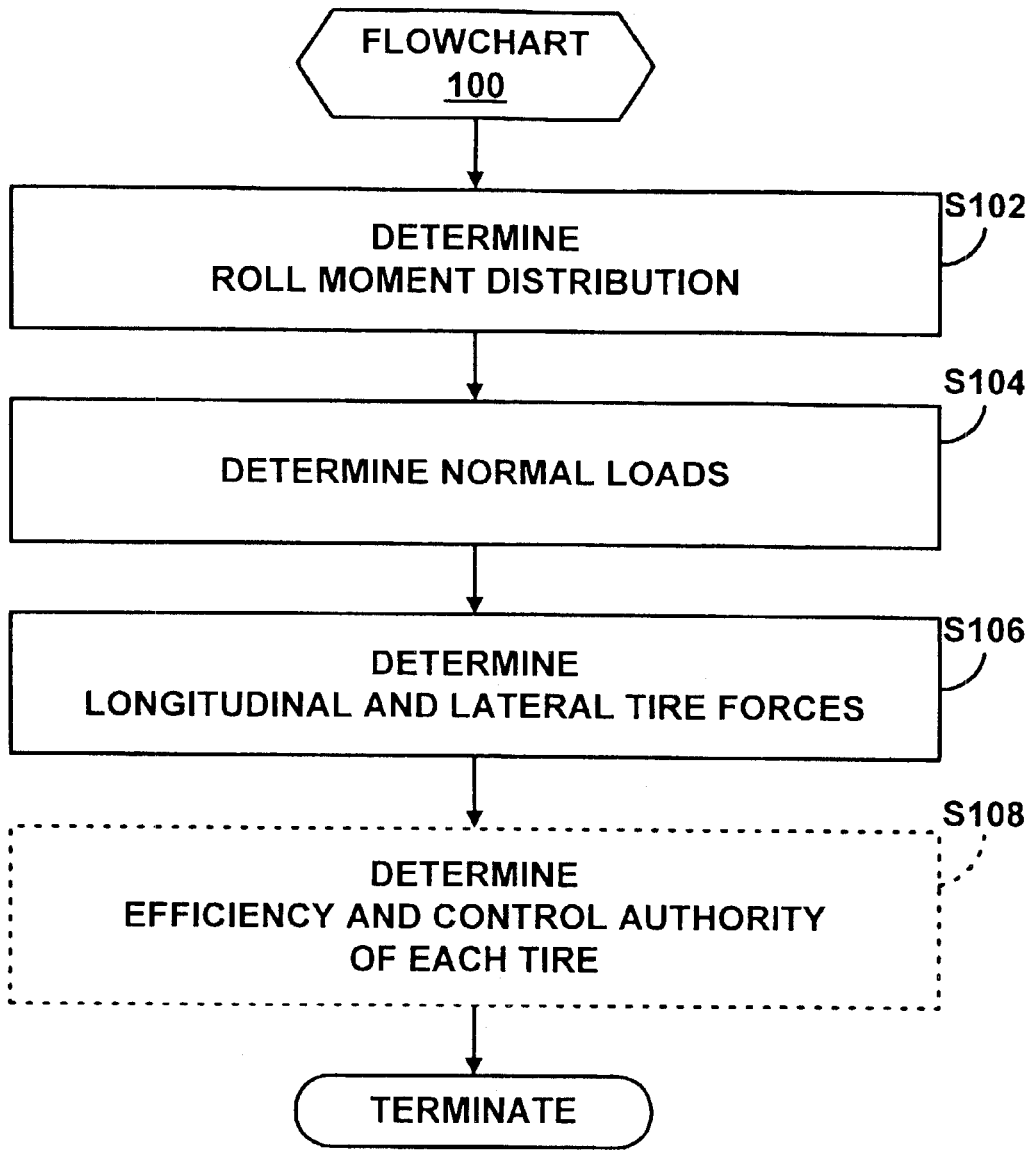
FIG. 5 illustrates a flow chart representative of a corrective input method in accordance with one embodiment of the present invention.

Here $F_{yLF}$ and $F_{yRF}$ are the lateral forces at the operating point calculated in stage S106 (FIG. 5). $F_{yLFmax}$ and $F_{yRFmax}$ are the maximum lateral forces achieved by steering up to saturation point of the tire lateral forces. They can be computed in accordance with the following equations [31] and [32]:

$$F_{yLFmax} = [(\mu N)^2 - F_{xLF}^2]^{1/2} \quad [31]$$

$$F_{yRFmax} = [(\mu N)^2 - F_{xRF}^2]^{1/2} \quad [32]$$

In the same manner, the control influence coefficients and the control authority can be determined for the active rear steer system.

2. Braking of Outside Front Wheel

In the case of braking of the outside front wheel, an incremental change in the braking force by $\Delta F_{xLF}$ causes a change (reduction) in the lateral force by $\Delta F_{yLF}$. Thus the changes in the lateral force, longitudinal force, and yaw moment are in accordance with the following equations [33]–[35]:

$$\Delta F_y = -\Delta F_{xLF} * \delta_f + \Delta F_{yLF} \quad [33]$$

$$\Delta F_x = \Delta F_{xLF} - \Delta F_{yLF} * \delta_f \quad [34]$$

$$\Delta M_{yaw} = -\Delta F_{xLF} * t_w/2 + \Delta F_{yLF} * a \quad [35]$$

Note that according to our sign convention clockwise yaw moment is positive, so in this case $\Delta M_{yaw}$ is negative (since $\Delta F_{yLF}$ is negative). The change in the lateral force brought about by braking can be determined as a function of braking force increment, $\Delta F_x$, and the operating point of vehicle. This yields the following equation [36]:

$$\Delta F_{yLF} = -2*F_{xLF}*F_{yLF}*\Delta F_{xLF}/[(\mu*N_{LF})^2 - F_{xLF}^2 - F_{yLF}^2] \quad [36]$$

Substituting this expression into the previous equations and calculating partial derivatives with respect to $\Delta F_{xLF}$ yields the following control sensitivity coefficients for the vehicle forces and yaw moment with respect to the change in brake force in accordance with the following equations [37]–[39]

$$\partial F_y/\partial F_{xLF} = -\delta_f - 2*F_{xLF}*F_{yLF}/[(\mu*N_{LF})^2 - F_{xLF}^2 - F_{yLF}^2] \quad [37]$$

$$\partial F_x/\partial F_{xLF} = 1 + 2*F_{xLF}*F_{yLF}/[(\mu*N_{LF})^2 - F_{xLF}^2 - F_{yLF}^2]*\delta_f \quad [38]$$

$$\partial M_{yaw}/\partial F_{xLF} = -t_w/2 - 2*a*F_{xLF}*F_{yLF}/[(\mu*N_{LF})^2 - F_{xLF}^2 - F_{yLF}^2] \quad [39]$$

The maximum reduction in the lateral force, the maximum braking force and the maximum change in the yaw moment are achieved when the longitudinal (braking) force is close to its maximum value, with very large brake slip, which causes reduction in the lateral force to about 20% of the total available force. Thus the maximum control authority in terms of lateral force, longitudinal force, and yaw moment is in accordance with the following equations [40]–[42]:

$$F_{ymax} = -F_{xLFmax}*\delta_f + 0.2*\mu*N_{LF}*\text{sign}(F_{yLF}) + F_{xLF}*\delta_f - F_{yLF} \quad [40]$$

$$F_{xmax} = F_{xLFmax} - 0.2*\mu*N_{LF}*\delta_f - F_{xLF} + F_{yLF}*\delta_f \quad [41]$$

$$M_{yawmax} = -(t_w/2)*F_{xLFmax} + a*0.2*\mu*N_{LF}*\text{sign}(F_{yLF}) + (t_w/2)*F_{xLF} - a*F_{yLF} \quad [42]$$

Here $F_{xLFmax} = 0.9*\mu*N_{LF}$. In the above expressions it was assumed that reduction in lateral force, increase in braking force and reduction in the yaw moment are required. If the opposite is true, then maximum control authority can be achieved by releasing the brake entirely.

In the same manner expressions for control sensitivity coefficients and the maximum control authority for remaining wheels can be obtained.

3. Roll Moment Distribution (Active Roll Bars)

In this case the lateral forces and yaw moment can be affected by controlling the normal load transfer across the front and rear axles. This is achieved by manipulating the roll moment distribution factor, $\kappa$, within a specified range of values $\kappa_{min}$ to $\kappa_{max}$. Under the assumption of small steering angles, the effect of roll moment distribution on longitudinal forces is quite small, and will be ignored here.

Let $\Delta N$ denote the total tire normal load transfer, which is approximately proportional to lateral acceleration. Then the lateral forces for the front and rear axles are in accordance with the following equations [43] and [44]:

$$F_{yf} = F_{yf0}*[1 - 2*k*(\kappa*\Delta N/N_0)^2] \quad [43]$$

$$F_{yr} = F_{yr0}*\{1 - 2*k*[(1-\kappa)*\Delta N/N_0]^2\} \quad [44]$$

where $F_{yf0}$ and $F_{yr0}$ are the lateral forces per axle which would have been achieved without load transfer, k is the cornering stiffness sensitivity coefficient to the normal load and $N_0$ is the nominal normal load per tire. The total lateral force and yaw moment acting on vehicle can be expressed in accordance with the following equations [45] and [46]:

$$F_y = F_{yf0}*[1 - 2*k*(\kappa*\Delta N/N_0)^2] + F_{yr0}*\{1 - 2*k*[(1-\kappa)*\Delta N/N_0]^2\} \quad [45]$$

$$M_{yaw} = F_{yf0}*a*[1 - 2*k*(\kappa*\Delta N/N_0)^2] - F_{yr0}*b*\{1 - 2*k*[(1-\kappa)*\Delta N/N_0]^2\} \quad [46]$$

Using these expressions the incremental change in the lateral force, $\Delta F_y$, and roll moment, $\Delta M_{yaw}$, brought about by an incremental change in the roll moment distribution, $\Delta \kappa$, can be calculated. The lateral force and yaw moment control sensitivity coefficients can then be obtained in accordance with the following equations [47] and [48]:

$$\partial F_y/\partial \kappa = 4*k*(\Delta N/N_0)^2*[\kappa*F_{yf} + (1-\kappa)*F_{yr}] \quad [47]$$

$$\partial M_{yaw}/\partial \kappa = -4*k*(\Delta N/N_0)^2*[\kappa*F_{yf}*a + (1-\kappa)*F_{yr}*b] \quad [48]$$

where $F_{yf}$ and $F_{yr}$ are the front and rear axle lateral forces at the operating point. It is seen that the sensitivity coefficients are proportional to the square of load transfer (e.g. lateral acceleration).

The maximum change (e.g. control authority) in the lateral force and yaw moment are in accordance with the following equations [49] and [50]:

$$\Delta F_{ymax} = F_{yfmin} + F_{yrmax} - F_{yf} - F_{yr} \quad [49]$$

$$\Delta M_{yawmax} = (F_{yfmin}*a - F_{yrmax}*b) - (F_{yf}*a - F_{yr}*b) \quad [50]$$

where $F_{yfmin}$ and $F_{yrmax}$ are the front and rear axle lateral forces, which correspond to the maximum roll moment distribution factor, $\kappa_{max}$ (max. roll moment at front axle, minimum at the rear). These forces can be found in accordance with the following equations [52] and [52]:

$$F_{yfmin} = F_{yf}*[1 - 2*k*(\kappa_{max}*\Delta N/N_0)^2]/[1 - 2*k*(\kappa*\Delta N/N_0)^2] \quad [51]$$

$$F_{yrmax} = F_{yr}*\{1 - 2*k*[(1-\kappa_{max})*\Delta N/N_0]^2\}/\{1 - 2*k*[(1-\kappa)*\Delta N/N_0]^2\} \quad [52]$$

These forces were determined for the case when reduction in the yaw moment (oversteer correction) is required. For the opposite case, the roll stiffness distribution $\kappa_{max}$ must be replaced by $\kappa_{min}$.

Using the methodology outlined above, control authority and control influence coefficients in terms of longitudinal force, lateral force and yaw moment as function of lateral and longitudinal accelerations can be determined in real time.

During a stage S116 of the flowchart 100, which control system/systems should be activated and to what extend in order to achieve the desired vehicle response (or at least to approach the desired response as closely as possible) is determined. The factors considered here are: (1) obtrusiveness of the system to the driver; (2) quickness of response; (3) desired control correction; and (4) available control authority for each system and the magnitude of control influence coefficients. Details of stage S116 depend on particular combination of active chassis systems available on a given vehicle and detailed description of all cases is beyond the scope of this invention. Generally, if based on the calculated control authority, the desired correction can be achieved by anyone of the available controllable chassis systems, then the one with the least degree of obtrusiveness and quick response will be activated (e.g. active rear steer or active roll bar). As the desired control correction increases, the systems with more control authority will be activated.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. In a vehicle including a plurality of active chassis systems, a method of determining a role of each active chassis system in applying at least one corrective input to the vehicle, said method comprising:

determining at least one control influence coefficient and a control authority for each active chassis system; and determining an activation status of each active chassis system based, at least partially, on each determined control influence coefficient and each determined control authority.

2. The method of claim 1, wherein the plurality of active chassis systems includes at least one of an active brake control system, an active front steer system, an active rear steer system, an active front and rear system and an active suspension system.

3. The method of claim 1, further comprising:

determining at least one cornering stiffness coefficient to thereby determine the at least one control influence coefficient for at least one of the plurality of active chassis systems.

4. A vehicle, comprising:

a plurality of active chassis systems; and a supervisory controller operable to determine at least one control influence coefficient and a control authority for each active chassis system, said supervisory controller further operable to determine an activation status of each active chassis system based, at least partially, on each determined control influence coefficient and each determined control authority.

5. The vehicle of claim 4, wherein the plurality of active chassis systems includes at least one of an active brake control system, an active front steer system, an active rear steer system, an active front and rear system and an active suspension system.

6. The vehicle of claim 4, wherein said supervisory controller is further operable to determine at least one cornering stiffness coefficient to thereby determine the at least one control influence coefficient for at least one of the plurality of active chassis systems.

7. The vehicle of claim 4, further comprising:

a plurality of chassis controllers, wherein each chassis controller corresponds to one of the plurality of active chassis systems, and wherein each chassis controller is operable to control the activation status of a corresponding active chassis system in response to receiving at least one control signal from the supervisory controller indicative of the activation status of a corresponding active chassis system.

8. A vehicle, comprising:

a plurality of active chassis systems; and a supervisory controller including means for determining at least one control influence coefficient and a control authority for each active chassis system, and means for determining an activation status of each active chassis system based, at least partially, on each determined control influence coefficient and each determined control authority.

9. The vehicle of claim 8, wherein the plurality of active chassis systems includes at least one of an active brake control system, an active front steer system, an active rear steer system, an active front and rear system and an active suspension system.

* * * * *